United States Patent [19]

Shobu et al.

[11] Patent Number: 5,692,130

[45] Date of Patent: Nov. 25, 1997

[54] METHOD FOR SELECTIVELY USING ONE OR TWO COMMUNICATION CHANNEL BY A TRANSMITTING DATA TERMINAL BASED ON DATA TYPE AND CHANNEL AVAILABILITY

[75] Inventors: Toshifumi Shobu, Atsugi; Fumihiro Ogasawara, Ebina, both of Japan

[73] Assignee: Ricoh Company, Ltd., Tokyo, Japan

[21] Appl. No.: 568,810

[22] Filed: Dec. 7, 1995

Related U.S. Application Data

[63] Continuation of Ser. No. 4,568, Jan. 14, 1993, abandoned.

[30] Foreign Application Priority Data

| Jan. 14, 1992 | [JP] | Japan | 4-23410 |
| Apr. 13, 1992 | [JP] | Japan | 4-118578 |

[51] Int. Cl.$^6$ ..................... G06F 13/00
[52] U.S. Cl. ............... 395/200.12; 395/200.06; 340/825.03
[58] Field of Search ............... 370/84, 110.1, 370/100.1, 54; 395/250, 850; 340/825.03; 375/260

[56] References Cited

U.S. PATENT DOCUMENTS

| 4,802,220 | 1/1989 | Marker, Jr. | 380/33 |
| 4,845,611 | 7/1989 | Turlakov et al. | 395/250 |
| 5,014,186 | 5/1991 | Chisholm | 395/200 |
| 5,058,133 | 10/1991 | Duncanson et al. | 375/260 |
| 5,105,382 | 4/1992 | Ogasawara | 395/250 |
| 5,111,425 | 5/1992 | Takeuchi et al. | 395/425 |
| 5,184,345 | 2/1993 | Sahni | 370/59 |
| 5,276,679 | 1/1994 | McKay et al. | 370/84 |
| 5,305,318 | 4/1994 | Ozeki et al. | 370/58.7 |
| 5,331,316 | 7/1994 | Mestdagh et al. | 340/825.03 |

FOREIGN PATENT DOCUMENTS

| 0 529 169 | 3/1993 | European Pat. Off. |
| 2 671 252 | 7/1992 | France . |
| 2-185142 | 10/1990 | Japan . |

OTHER PUBLICATIONS

Patent Abstracts of Japan, vol. 14, No. 461 (E–0987), Oct. 5, 1990, JP–2–185142, Jul. 19, 19.

NTZ Nachrichten Technische Zeitschrift, vol. 44, No. 12, pp. 880–883, Dec. 1991, Ralf Hinz, "Kommunikationsprotokoll fur Bildtelefon–Endeinrichtungen".

*Primary Examiner*—Thomas C. Lee
*Assistant Examiner*—Duo Chen
*Attorney, Agent, or Firm*—Oblon, Spivak, McClelland, Maier & Neustadt, P.C.

[57] ABSTRACT

In a communication method for data terminal equipment, which communication method includes a function of forming a communication link comprising a plurality of B channels by having a calling terminal and a called terminal execute, via an ISDN, a plurality of call connecting procedures, and of effecting a data transmission by simultaneously using the plurality of channels of the communication link thus formed, the number of times that the call connecting procedures are executed is adjusted in accordance with conditions that prevail during a communication, and a data transmission is effected in the communication link comprising a plurality of channels, the total number of which channels corresponds to the number of times that the call connecting procedures are executed.

5 Claims, 7 Drawing Sheets

5,692,130

METHOD FOR SELECTIVELY USING ONE OR TWO COMMUNICATION CHANNEL BY A TRANSMITTING DATA TERMINAL BASED ON DATA TYPE AND CHANNEL AVAILABILITY

This application is a continuation of application Ser. No. 08/004,568, filed on Jan. 14, 1993, now abandoned.

BACKGROUND OF THE INVENTION

The present invention relates to a communication method for data terminal equipment, which communication method allows a transmitting side and a receiving side to form a plurality of communication links via communication networks, and includes a function of effecting a data transmission between the two sides by simultaneously using the plurality of communication links.

In ISDN, an access line having a basic interface for use in conventional terminals has one D channel for call controlling purposes and two B channels for information transmission.

There is proposed by CCITT a bulk transfer mode in which the two B channels in such an access line having a basic interface are simultaneously used so as to enable high-speed transmission.

In this bulk transfer mode, the transmitter effects a transmission by causing the transmitted data to branch and to be fed to the two B channels, one byte at a time. The receiver sequentially retrieves the data from the two B channels, one byte at a time.

It is to be noted in ISDN that the communication links formed of the two B channels do not always reside on the same route, and a difference in transmission delay time between the two channels may result. In the case that there is a difference, the data transmitted at the same time via the two B channels are not received by the receiver at the same time. Accordingly, the above-mentioned bulk transfer mode, in which a terminal equipment unit is required to manage the order of one-byte bulk data transmission, is not fully utilized because of its complexity in transmission procedure.

Conventionally, terminal equipment requiring high-speed transmission executes, in a normal mode, two call set-up procedures for the same called party so that the communication links formed of two B channels may be established at the same time, which channels are utilized in data transmission. A conventional practice in such a case is that each channel is allowed to transmit data units having a relatively large volume, thus eliminating a complicated process of managing each byte of one-byte bulk data transmitted via the channels.

It is also to be noted that a conventional terminal equipment unit permanently uses both B channels for communication.

In ISDN circuits, a maximum of eight terminal equipment units are connected to one circuit, and each terminal equipment unit normally uses one B channel.

Consequently, when a terminal equipment unit using two B channels originates a call to another terminal equipment unit while any of the other units connected to the receiving end is busy, no communication is established. Also, if the one terminal equipment unit that originates a call is a conventional unit using only one B channel in communication, no communication is established.

It is also to be noted that once communication is started with one particular terminal equipment unit by using two B channels, all the other terminal equipment units are disabled for communication because, both at the calling side and at the called side, one terminal equipment unit is occupying the B channels.

Thus, the conventional art has a disadvantage in that either of the following situations can easily occur: when one equipment unit is engaged in communication, another unit requiring two-channel communication is disabled for communication; or, when one equipment unit is engaged in communication using two channels, the other units are disabled for communication.

SUMMARY OF THE INVENTION

An object of the present invention is to provide a method for communication between data terminal equipment units, in which method the above disadvantages are eliminated.

A more specific object of the present invention is to provide a method for communication between data terminal equipment units, in which method the likelihood is reduced as much as possible of any equipment unit becoming disabled for communication.

The object of the present invention can be achieved by a communication method for data terminal equipment, which communication method includes a function of forming communication links formed of a plurality of B channels by having a calling terminal and a called terminal execute, via an ISDN, a call connecting procedure a plurality of times, and of effecting a data transmission simultaneously using the plurality of channels of the communication links thus formed, the communication method being characterized in that the number of times that a call connecting procedure is executed is adjusted in correspondence with conditions that prevail during communication, and a data transmission is effected over the communication links formed of a plurality of channels, the total number of which channels corresponds to the number of times that a procedure is executed.

Other objects and further features of the present invention will be apparent from the following detailed description when read in conjunction with the accompanying drawings.

DESCRIPTION OF THE PREFERRED EMBODIMENTS

The embodiments of the present invention will be described below with reference to the accompanying drawings.

Figure 1:
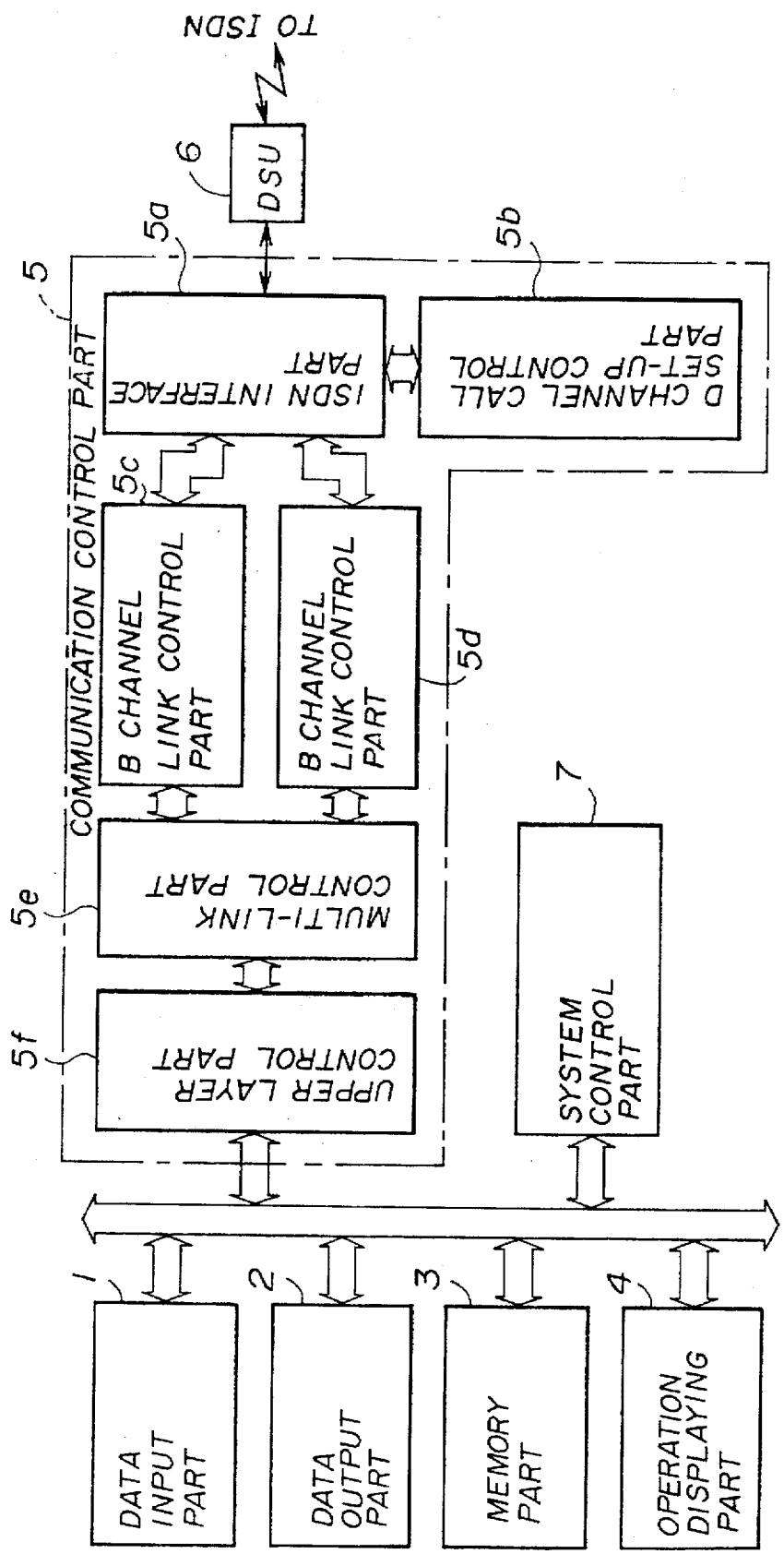
FIG. 1 is a block diagram of a data terminal equipment unit according to an embodiment of the present invention.

FIG. 1 is a block diagram of a data terminal equipment unit according to an embodiment of the present invention. Referring to the figure, a data input part 1 is fed an input of transmitted data; and a data output part 2 outputs received data. Assuming that this unit is an image transmitting apparatus, the data input part 1 is a scanner for reading in an image of the original; and the data output part 2 is a plotter for recording the received image. A memory part 3 is a memory for storing the transmitted/received data as required. An operation display part 4 displays the status of operations as an operator performs various operations.

A communication control part 5 executes data transmission and reception to and from ISDN. An ISDN interface part 5a in this communication control part 5 is connected to an ISDN via a DSU (digital service unit) 6, and effects signal transmission/reception to and from the ISDN. A D channel call set-up control part 5b effects call control by transmitting and receiving various call control messages via a D channel. B channel link control parts 5c and 5d correspond to a B1 channel and a B2 channel, respectively, and effect data transmission and reception via communication links formed of the channels. When the two B channels are simultaneously used, a multi-link control part 5e causes transmitted data to branch and to be fed to each of the B channel link control parts 5c and 5d or combines the data received via the two parts. An upper layer control part 5f executes transmission control according to a predetermined protocol.

A system control part 7 is a microcomputer for monitoring and controlling the above-described parts; and a system bus 8 is a signal line along which data and control signals are exchanged between the parts.

A description will now be given, with reference to the above configuration, of communication operations executed between data terminal equipment units of the present invention.

Figure 2:
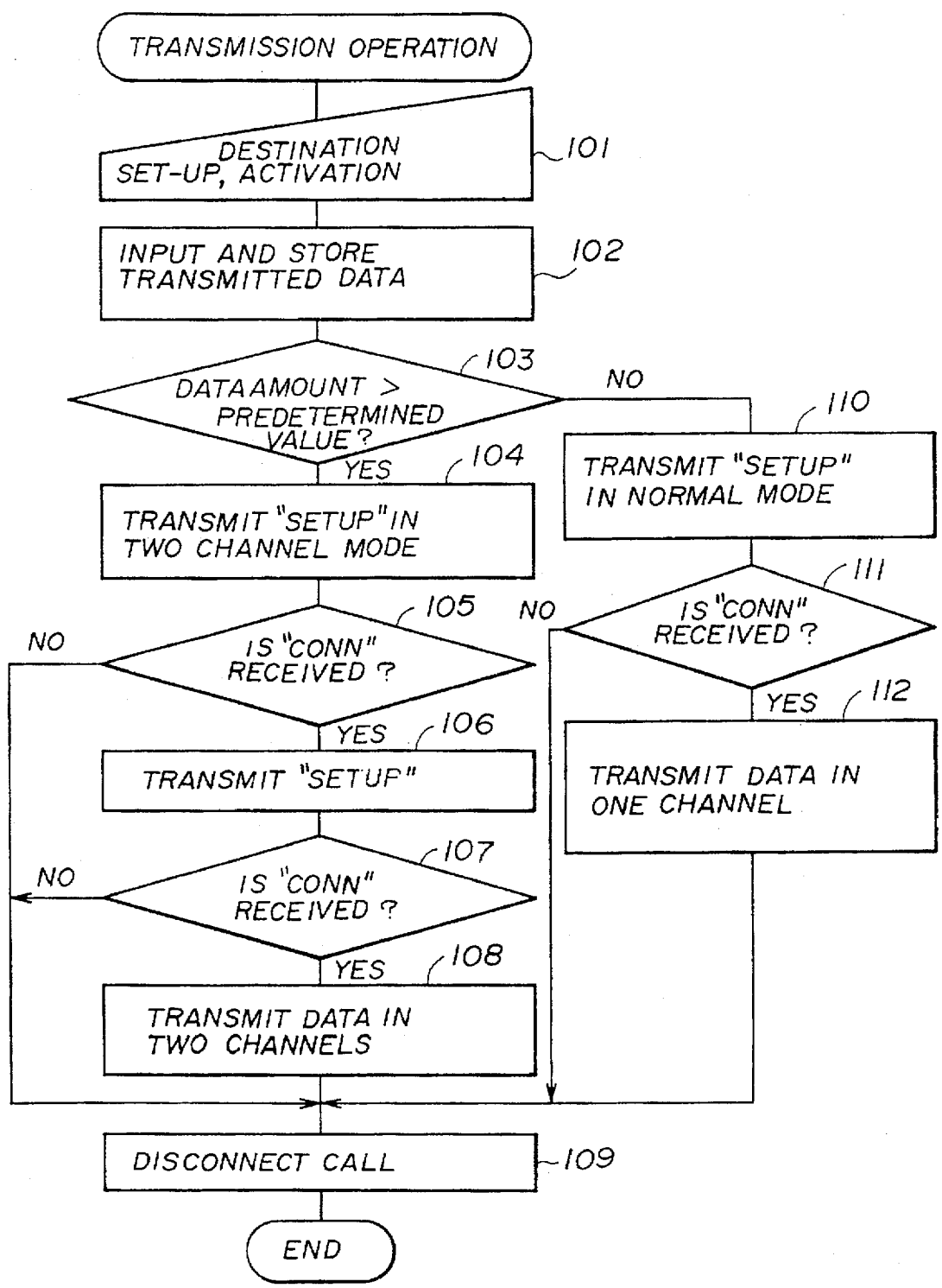
FIG. 2 is a flow chart of transmission operation.

As shown in FIG. 2, when executing a transmission operation, an operator at the calling terminal presets a transmission address with a predetermined procedure and activates the data terminal (step 101).

Figure 3:
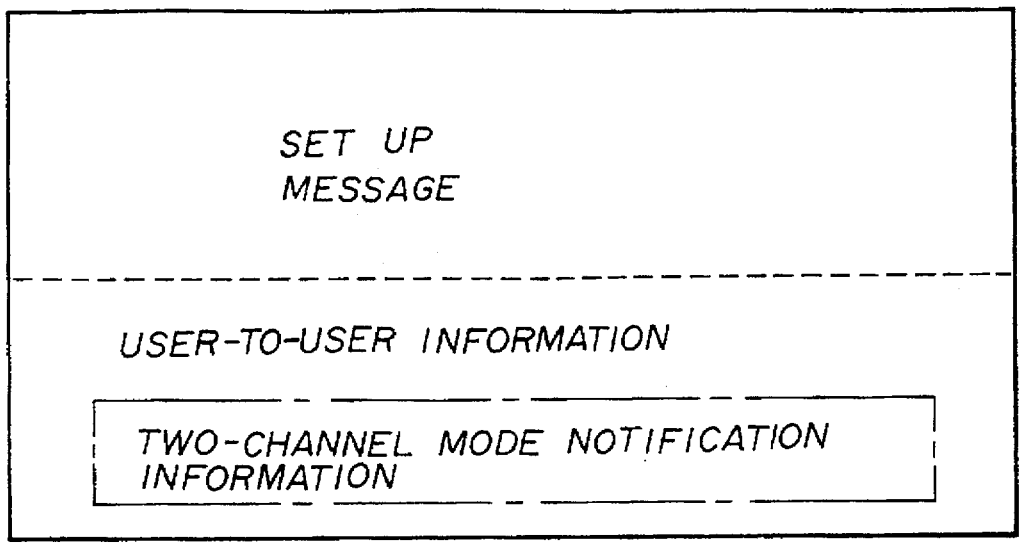
FIG. 3 shows information attached to a call set-up message SETUP.

The activated data terminal equipment unit is fed input of transmitted data such as image information and stores the same in the memory part 3 (step 102). A determination is made as to the amount of the transmitted data thus stored (step 103). When it is determined that the data amount exceeds a predetermined value (N in step 103), a two-channel mode call set-up message SETUP is transmitted so that a call is originated. A two-channel mode is a communication mode in which two B channels are simultaneously used in a data transmission. In this case, the call set-up message SETUP is transmitted after being integrated with user-to-user information in the form of notification information specifying the two-channel mode, as shown in FIG. 3 (step 104). An answer from the ISDN side is waited for (step 105).

Figure 4:
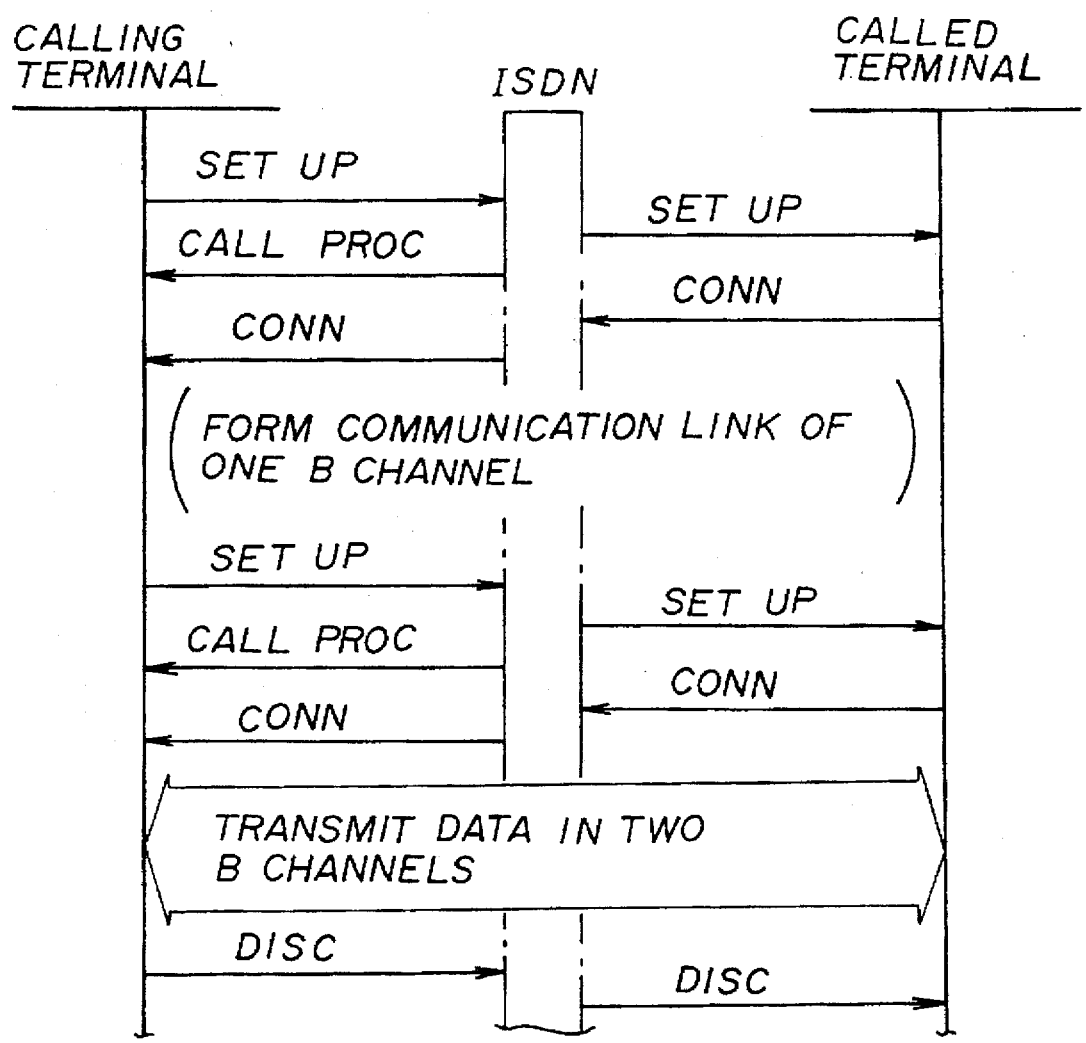
FIG. 4 shows a call set-up procedure.

The ISDN forwards, to a called terminal, the call set-up message SETUP transmitted from the calling terminal, as shown in FIG. 4, while at the same time responds to the calling terminal by sending a CALL PROC message indicating a call set-up is accepted.

When the called terminal receives the call set-up message SETUP, it transmits an answer message CONN. At this point in the sequence, the called terminal reads the above two-channel mode notification information attached to the call set-up message SETUP, and recognizes that the communication is to proceed in the two-channel mode. The ISDN forwards the answer message CONN to the calling terminal.

In this way, a communication link formed of one of the B channels is formed between the calling terminal and the called terminal.

When the calling terminal receives the answer message CONN (Y in step 105), it transmits the call set-up message SETUP again (step 106), and waits for an answer (step 107). This call set-up message SETUP is forwarded to the called terminal, and the called terminal responds with the answer message CONN. This completes the call set-up procedure like the above for the second time.

When the calling terminal receives the second answer message CONN (N in step 107), it performs a predetermined transmission control procedure for the B1 channel and B2 channel. For example, the entire block of data to be transmitted may be divided to produce a first half and a second half, the first half being transmitted via the B1 channel and the second half being transmitted via the B2 channel. In such a case, the B1 channel and the B2 channel transmit mutually independent data, namely the first half and the second half. This way, the receiving end can receive the data without any trouble even if there is a difference in transmission delay time between the transmissions via the two channels. The simultaneous use of two B channels ensures 128 kbps data transmission (step 108).

A disconnect message DISC is transmitted thereafter (step 109). This causes a call disconnecting procedure to be effected, and the communication operations of the calling terminal and the called terminal are terminated.

When it is found that the transmitted data amount is below the predetermined value (N in step 103), the aforementioned user-to-user information is not added, and the normal call set-up message SETUP is transmitted so that a call is originated (step 110). When the calling terminal receives the answer message CONN (Y in step 111), data is transmitted in a normal manner using one B channel (step 112). The call is disconnected when the transmission is over (step 109).

In the case that the answer message CONN is not returned from the called terminal (N in step 105, N in step 107 or N in step 111) due, for example, to its being engaged in communication, the call is disconnected on the spot (step 109).

As shown above, this embodiment is configured such that a data transmission using two B channels is effected when there is a large amount of data to be transmitted, and a normal data transmission using one B channel is effected when the transmitted data amount is small.

Generally speaking, it is desirable, when the transmitted data amount is large, that a high-speed transmission is effected and transmission time is reduced accordingly. This embodiment deals with such a case, where a high-speed transmission is required, by providing two-channel data transmission and thus reducing transmission time.

When additional terminal equipment units are connected to the same circuit as the terminal equipment unit of this embodiment engaged in communication using two B channels, the additional units are disabled for communication. This embodiment, however, lessens the likelihood of other terminal equipment units being disabled, because when the transmitted data amount is small, a normal one-channel transmission is employed.

While the above-described embodiment allows the calling terminal to notify the called terminal that the two-channel mode is to be employed by using the D channel, in other words by means of the call control procedure, the notification can also be done by using the B channel, in which latter case a predetermined transmission control procedure is initiated in the B channel communication link formed at the beginning. It is possible thus that the two-channel mode notification information is transported by means of a layer 2 XID (eXchange IDentification) frame or by means of an exchange procedure for a layer 3 CR (call request) packet and for a CA (call acceptance) packet.

While this embodiment allows switching between two-channel communication and one-channel communication on the basis of the transmitted data amount, the switching can also be based on the type of transmitted data such that, for example, two-channel transmission is effected in the case of color image information and one-channel transmission is effected in the case of black-and-white image information. It is also possible that the operator can manually select either two-channel communication or one-channel communication.

A description follows of another embodiment of the present invention.

The calling terminal of this embodiment originates a call to the transmission address by following the same operations as those in the aforementioned embodiment described with reference to FIG. 2. That is, a call is originated in a normal mode and normal communication using one B channel takes place, when the transmitted data amount is below a predetermined value.

Figure 6:
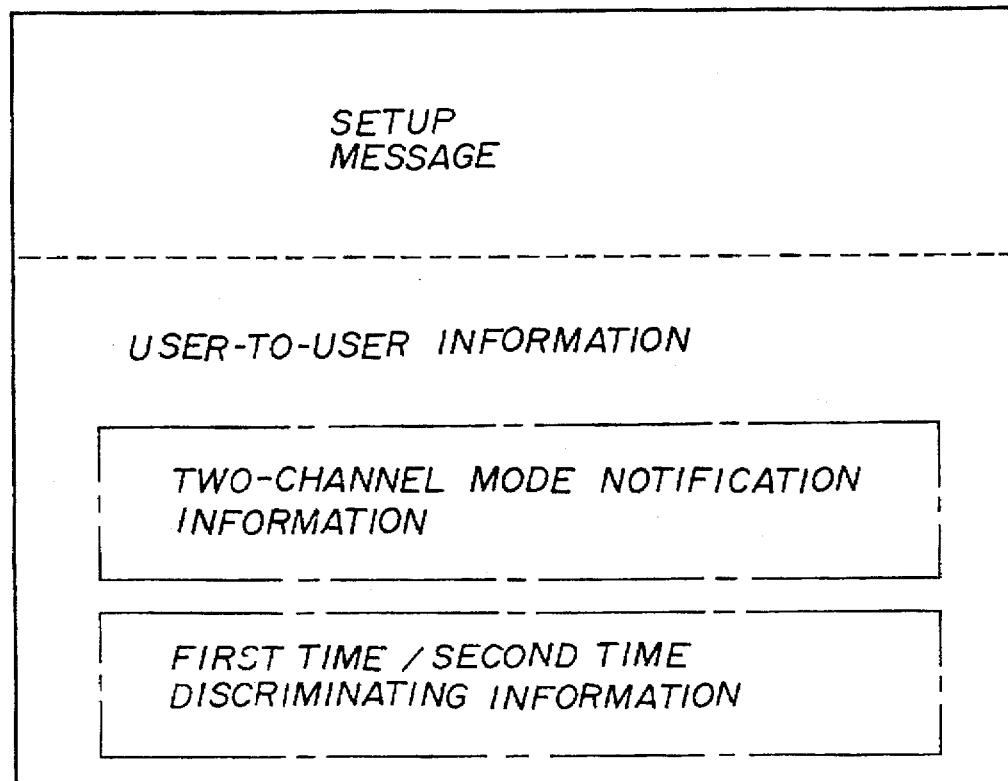
FIG. 6 shows information attached to the call set-up message SETUP in the above embodiment.
Figure 5:
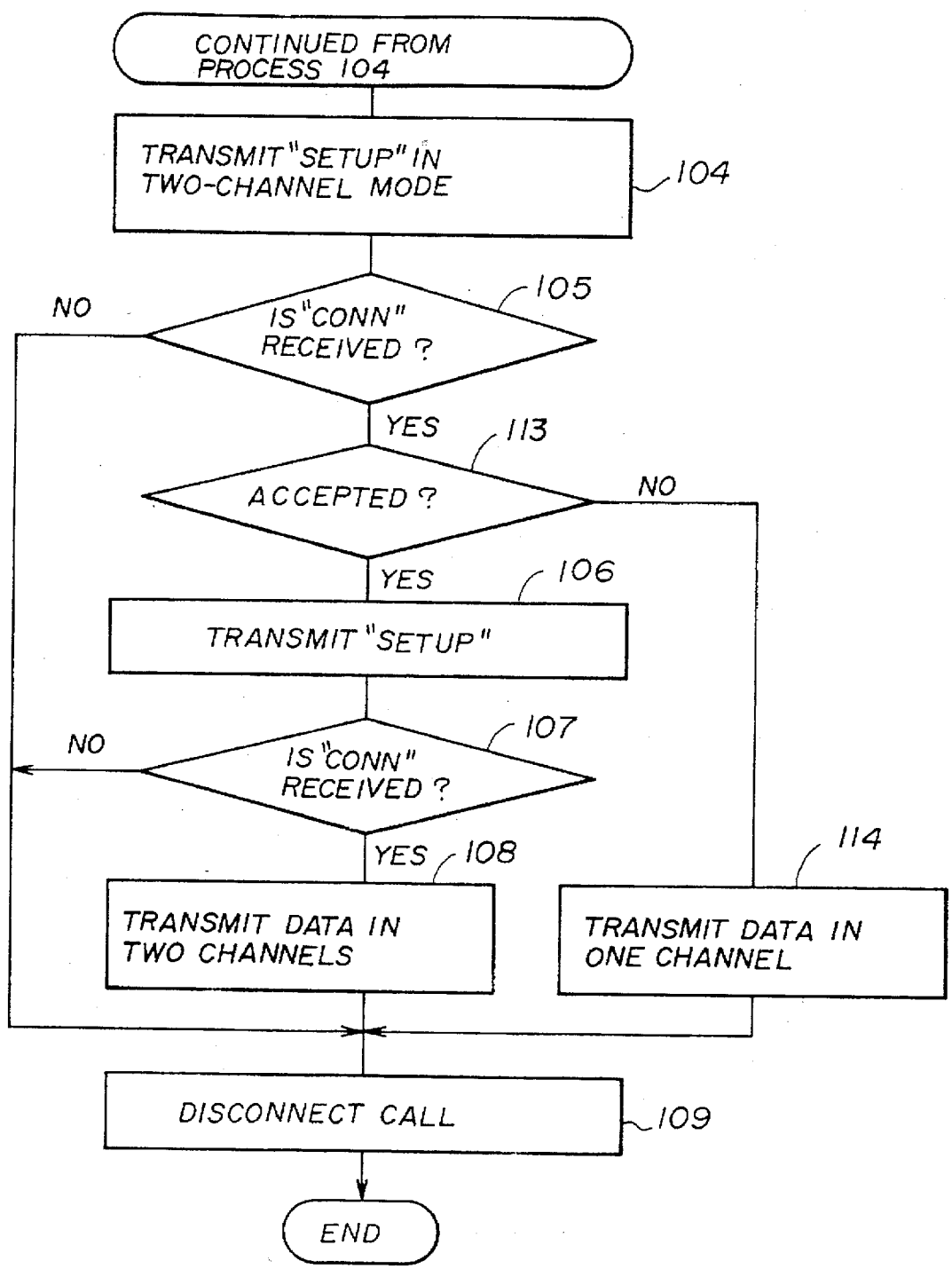
FIG. 5 is a flow chart of the operations of a calling terminal in another embodiment of the present invention.

FIG. 5 shows operations of the calling terminal when the transmitted data amount exceeds the predetermined value. In this case, as shown in FIG. 6, the calling terminal originates a call by attaching the two-channel mode notification information and first time/second time discrimination information to a call set-up message SETUP to be transmitted (step 104). This first time/second time discrimination information discriminates between the first time that the call set-up message SETUP is transmitted and the second time that the same message is transmitted to set the two-channel mode. In the present case, the discrimination information indicates the first time. The call set-up message SETUP of such a configuration is transmitted and the response is waited for (step 105).

Figure 7:
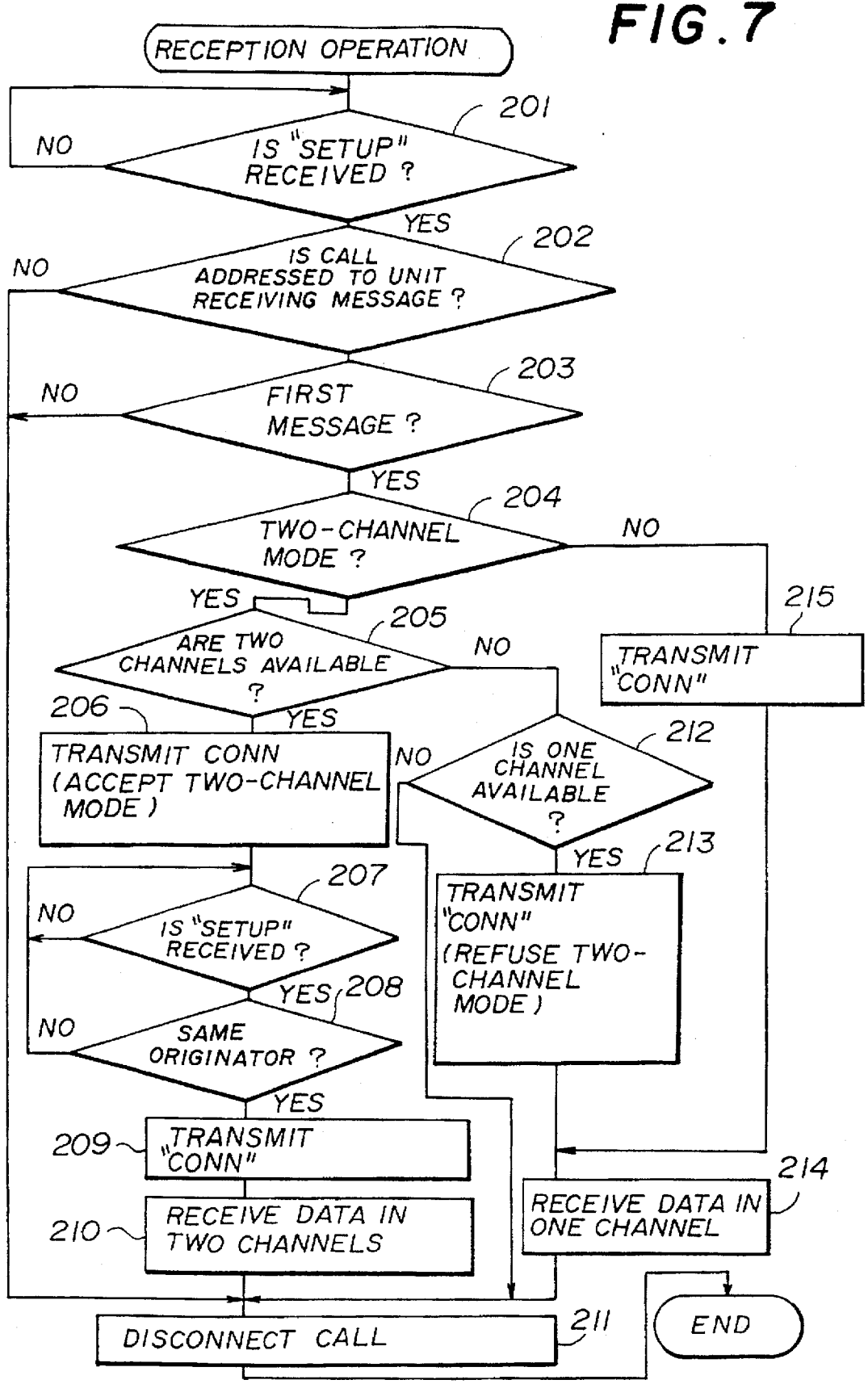
FIG. 7 is a flow chart of the operations of a called terminal in the above embodiment.

As shown in FIG. 7, the called terminal continuously waits for the reception of the call set-up message SETUP (the loop in step 201). When a terminal receives the call set-up message SETUP (Y in step 201), the terminal determines whether the call is addressed to itself by referring to such information factors as the destination subaddress and transfer capability of the received message (step 202).

When it is determined that the call is addressed to the terminal that has received the message (Y in step 202), the called terminal determines whether or not the call set-up message SETUP is transmitted for the first time, on the basis of the first time/second time discrimination information attached to the message (step 203). When, for example, there is no destination subaddress provided in the received call set-up message SETUP and other terminal equipment unit(s) are connected to the same circuit, there is a likelihood that the received message is the call set-up message SETUP transmitted to another terminal for the second time.

The terminal that has received the message, after receiving the first-time call set-up message SETUP (Y in step 203), determines whether or not the two-channel mode notification information is attached to the message (step 204).

When it is found that the two-channel mode notification information is attached (Y in step 204), a determination is made as to whether or not both B channels are available (step 205). A B channel will be occupied when any other terminal equipment unit in the same circuit is engaged in communication.

Figure 8:
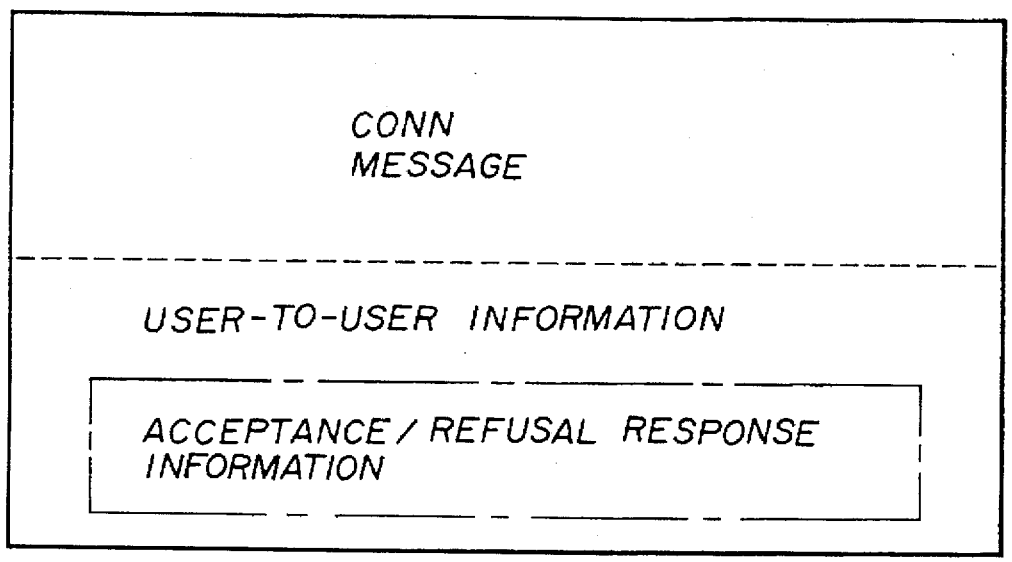
FIG. 8 shows information added to an answer message CONN in the above embodiment.

When it is found that no other terminal equipment unit is engaged in communication and both B channels are available (Y in step 205), the answer message CONN is transmitted. As shown in FIG. 8, acceptance/refusal answer information concerning the two-channel mode is attached, as user-to-user information, to the response message CONN. In the present case, the answer information indicates acceptance of the two-channel mode (step 206). It is to be noted that an originating address, in other words the telephone number of the calling party, which address is one of the information elements attached to the received call set-up message SETUP, is stored in a memory.

Thereafter, the reception of the call set-up message SETUP is waited for (step 207).

The calling terminal, upon receiving the answer message CONN (Y in step 105 of FIG. 5), determines whether or not the called terminal has accepted the two-channel mode (step 113). When the user-to-user information is attached to the received answer message CONN and the user-to-user information is integrated with the aforementioned answer information indicating acceptance, a determination results that the called terminal has accepted the two-channel mode communication. In that case (Y in step 113), the call set-up message (SETUP) is integrated with the discrimination information indicating the second-time transmission and is transmitted again (step 106), and the response is waited for (step 107).

When the called terminal has received the call set-up message SETUP after transmitting the answer message CONN (Y in step 207 of FIG. 6), it checks the originating address of the message and determines whether or not the messages originate from the same party (step 208). There are cases where the second message is from a different party or the second message is from a different party and addressed to a different terminal equipment unit. In that case (N in step 208), the operational flow returns to the state of waiting for the call set-up message SETUP (step 207). When it is found that the second message is from the same party (Y in step 208), the called terminal transmits the answer message CONN (step 209).

The calling terminal, upon receiving the second answer message CONN (Y in step 107), transmits the data using two B channels as in the aforementioned embodiment (step 108). The called terminal receives the transmitted data (step 210). When the data transmission/reception is terminated, the calling terminal and the called terminal disconnect the call (step 119, step 211).

If it is not the case that both of the B channels are available when the two-channel mode notification is received by the called terminal (N in step 205), a determination is made as to whether or not one channel is available (step 212). When it is found that one channel is available (Y in step 212), the called terminal integrates the answer message CONN with the discrimination information indicating refusal of the two-channel mode and transmits the message (step 213).

The calling terminal effects data transmission using one B channel (step 114) upon finding the two-channel mode is refused in the received answer message CONN (N in step 113). The called terminal effects, in response to this, data reception by using one B channel (step 214). When the data transmission/reception is over, call disconnections are effected (step 109, step 211).

When the called terminal receives the call set-up message SETUP and finds no notification information specifying the two-channel mode (N in step 204), it transmits a normal answer message CONN (step 215), and effects data transmission using one B channel (step 114).

As has been described, this embodiment allows, when the transmitted data amount is large, the calling terminal to notify, when the call is originated, the called terminal of the request for two-channel mode. The called terminal, upon receiving the notification, checks the availability of the B channels. When both channels are available, a response indicating acceptance of the two-channel mode transmission is returned. In that case, the calling terminal forms another communication channel by executing a call connecting procedure again, enabling two-channel data transmission. In this way, efficient communication requiring reduced time can be achieved.

The called terminal returns, to the calling terminal, a refusal of the two-channel transmission when there is only one B channel available. The calling terminal consequently effects data transmission using the already-formed one-channel communication link. While such communication takes double the time as compared to the aforementioned two-channel transmission, the resulting communication generally serves the need.

This embodiment also allows the called terminal to notify the calling terminal of acceptance or refusal of the two-channel mode by means of the user-to-user information attached to the answer message CONN. Since the user-to-user information is a standard information element that can be defined at will and used by the user, the above operations can be performed without using special symbols or special procedures.

The calling terminal is configured such that, when the calling terminal finds that the answer information indicating acceptance of the two-channel mode is not integrated with the answer message (CONN) received upon the origination of a call, the calling terminal effects data transmission using one channel. In the case that the called terminal is the conventional equipment unit not capable of two-channel mode communication, the answer information will not be received. Since normal one-channel data transmission is performed in such a case, data transmission to the conventional equipment unit is possible.

It is also possible to configure the above embodiment such that, when the data terminal equipment unit of this embodiment receives a call from one party while communicating with another party using one channel, the data terminal equipment unit responds to the call and enters into communication with the new calling party to effect data transmission by using the remaining one channel.

While the descriptions of the above embodiments assume that the calling terminal is the data transmitting side and the called terminal is the receiving side, the opposite can equally be valid.

While the above descriptions assume the basic 2B+1D interface, where there are provided two B channels and one D channel, it is to be noted that ISDN provides other interfaces including the primary rate 23B+1D interface. The present invention is applicable to a case where these other interfaces are employed in data transmission. In these cases, data transmission using three B channels or more is possible as required. A configuration required in such cases is that the called terminal notifies the calling terminal of the available number of channels while a call is being connected and the calling terminal proceeds with the call connecting procedure in accordance with the notification.

Figure 9:
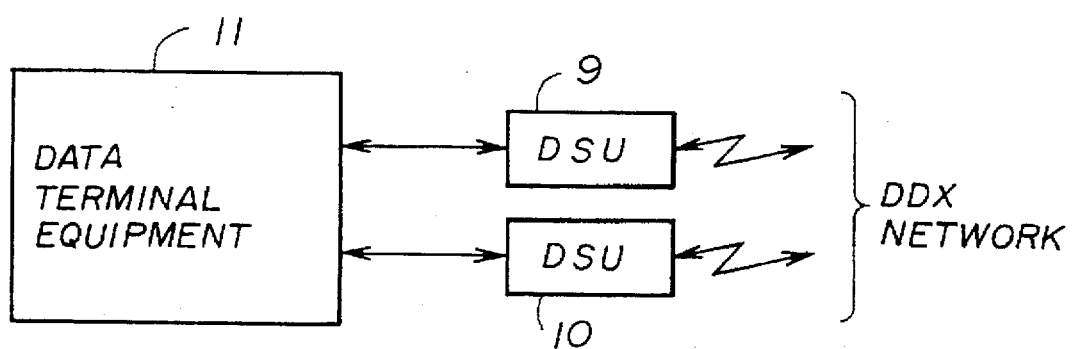
FIG. 9 is a block diagram of a data terminal equipment unit according to still another embodiment of the present invention.

While the above descriptions assume an ISDN terminal equipment unit, the present invention is applicable to a terminal equipment unit of other digital networks. Specifically, consider a data terminal equipment unit 11 connected to two DDX lines via DSU 9 and 10, as shown in FIG. 9. When a high-speed transmission is required, as in the aforementioned embodiment, in such a data terminal equipment unit 11, communication links formed of lines are formed by originating two calls to one destination simultaneously or sequentially using two lines. This enables a high-speed transmission having a data transmission rate double that of the conventional rate. It is also possible to provide three lines or more so that, depending upon the prevailing communication conditions, transmission at an even higher rate is enabled.

As has been described, the number of channels in B-channel communication link used in data transmission is adjusted depending upon the communication conditions, making it possible to release the B channels if necessary. This lessens the chance that calling side terminal equipment units other than the unit currently engaged in communication are disabled for communication. Since the calling terminal is capable of communicating as long as enough channel(s) are available, the chance that the calling terminal is disabled for communication is lessened.

The present invention is not limited to the above-described embodiments, and variations and modifications may be made without departing from the scope of the present invention.

We claim:

1. A method of providing data transmission from a transmitting terminal connected to an integrated service digital network of data to a receiving terminal using a plurality of data channels in said network, said method comprising the steps of:

establishing at least a single channel of communication from said transmitting terminal to said receiving terminal;

determining in said transmitting terminal if the amount of data to be transmitted from said transmitting terminal is greater than a predetermined amount and if said determination indicates that the amount of data exceeds the predetermined amount, forwarding a procedural request to said receiving terminal for access to a second channel;

responding by said receiving terminal, and indicating the availability of a second channel as well as the capability of said receiving terminal to accept data on a plurality of channels;

determining at said transmitting station based upon a returned signal from said receiving terminal that multiple channels may be employed, and capturing a second channel and dividing the data to be transmitted, wherein the dividing occurs in an independent first half and an independent second half;

transmitting via a first channel the first half of said data from said transmitting station and transmitting said second half via a second channel to said receiving station over mutually independent channels and wherein said division of the data is mutually independent based upon the division that occurs in said transmitting terminal;

transmitting via a single channel all of the data from said first terminal to said second terminal via a single channel in response to a denial of availability of multiple channel communication capability or availability of a second channel by said receiving terminal, wherein said request for multiple channels is dynamically performed making it possible to release the second channel based on communication conditions; and determining a type of data to be transmitted, wherein the step of transmitting via the first and second channels and the step of transmitting via the single channel are alternatively performed based on the type of data which has been determined.

2. A method according to claim 1, wherein the step of determining the type of data determines whether the data to be transmitted is color image information or black-and-white image information.

3. A method for establishing communication over an integrated service digital network, comprising the steps of:

determining a type of data which is to be transmitted;

determining whether two channels are available for transmitting the data;

determining whether one or more than one channels are to be used for transmitting the data using the type of data which has been determined and whether two channels are available; and transmitting the data using one or more than one channels, depending on whether the step of determining whether one or more than one channels are to be used determines that one channel is to be used or determines that more than one channel is to be used.

4. A method according to claim 3, further comprising the step of:

determining if an amount of data to be transmitted is greater than a predetermined amount, wherein the step of determining whether one or more than one channels are to be used for transmitting the data is performed based on both the determined type of data and the determined amount of data to be transmitted.

5. A method according to claim 4, wherein the step of determining a type of data which is to be transmitted determines whether the data to be transmitted is color image information or black-and-white image information.

* * * * *